(12) United States Patent
Chua et al.

(10) Patent No.: US 7,583,195 B2
(45) Date of Patent: Sep. 1, 2009

(54) SECURITY TAG ADAPTER FOR CONTAINERS

(75) Inventors: Benedict Chua, Singapore (SG); Wu Zhao Lian, Hangzhou (CN)

(73) Assignees: Checkpoint Systems, Inc., Thorofare, NJ (US); Century Plastic & Electronic Co., Ltd., Hangzhou Zhejiang (CN)

( * ) Notice: Subject to any disclaimer, the term of this patent is extended or adjusted under 35 U.S.C. 154(b) by 337 days.

(21) Appl. No.: 11/466,256

(22) Filed: Aug. 22, 2006

(65) Prior Publication Data

US 2008/0048868 A1 Feb. 28, 2008

(51) Int. Cl.
G08B 13/14 (2006.01)

(52) U.S. Cl. ............ 340/572.9; 340/572.1; 340/825.36; 340/10.1; 340/568.1

(58) Field of Classification Search ............... 340/568.1, 340/572.1–572.9, 568.7, 531, 539.1, 571, 340/539.11, 539.13, 5.1, 5.9, 5.92, 10.1, 340/10.5, 10.51, 5.3, 825.36, 825.49, 825.499
See application file for complete search history.

(56) References Cited

U.S. PATENT DOCUMENTS

| | | | | |
|---|---|---|---|---|
| 4,619,447 | A | * | 10/1986 | Blake .......................... 269/221 |
| 4,940,968 | A | * | 7/1990 | De Nood .................. 340/572.5 |
| 5,081,445 | A | | 1/1992 | Gill et al. |
| 5,108,029 | A | * | 4/1992 | Abrams et al. .......... 229/125.09 |
| 5,730,307 | A | * | 3/1998 | Karpisek ........................ 220/6 |
| 6,137,413 | A | | 10/2000 | Ryan, Jr. |
| 6,342,838 | B1 | | 1/2002 | Kolton et al. |
| 6,676,175 | B2 | * | 1/2004 | Jaeb et al. .................... 292/116 |
| 6,696,955 | B2 | * | 2/2004 | Kolton et al. ............ 340/572.8 |
| 2003/0089513 | A1 | | 5/2003 | Nolte |
| 2003/0235027 | A1 | | 12/2003 | Smeyak et al. |
| 2004/0050724 | A1 | | 3/2004 | Grul et al. |
| 2004/0233042 | A1 | | 11/2004 | Piccoli et al. |
| 2006/0086808 | A1 | * | 4/2006 | Appalucci et al. ........... 235/492 |

FOREIGN PATENT DOCUMENTS

| | | |
|---|---|---|
| EP | 1083519 | 3/2001 |
| GB | 2088345 | 6/1982 |

* cited by examiner

*Primary Examiner*—Benjamin C Lee
*Assistant Examiner*—Daniel Previl
(74) *Attorney, Agent, or Firm*—Caesar, Rivise, Bernstein, Cohen & Pokotilow, Ltd.

(57) ABSTRACT

A re-usable security hard tag for use with containers. The hard tag comprises two portions that are pivotally connected at first portion ends and the portions include semi-circular, outwardly extending flanges. A security tag is associated with one of the two portions. A displaceable pin of a latch mechanism locks together respective pin receptacles of each portion. The flanges couple to the bottom edge of either end of a container whereupon closure of the two portions' free ends about a hinge causes the pin to latch through the pin receptacles. The only way retract the pin and thereby release the hard tag from the container is by positioning the hard tag/container assembly adjacent a properly sized magnet available at a point of sale in a retail establishment. Non-removal of the hard tag before leaving the retail establishment causes store electronics to detect the security tag and set off an alarm or other warning.

35 Claims, 3 Drawing Sheets

US 7,583,195 B2

SECURITY TAG ADAPTER FOR CONTAINERS

BACKGROUND OF THE INVENTION

1. Field of Invention

The current invention relates to security tags and more particularly, to re-usable security tags that can be used with containers such that an RF receiver is able to readily discern a return signal from the tag.

2. Description of Related Art

The prior art teaches various mechanisms of using security tags to secure a multitude of different products. Some examples of commonly known security tags are RF (radio frequency), AM (acousto-magnetic) tags and EM (electro-magnetic) tags, traditionally known as electronic article surveillance (EAS) tags. Other security tags, e.g., radio frequency identification (RFID) tags, including UHF (ultra-high frequency) tags, make use of electronic integrated circuits. EAS, RFID and other types of electronic security tags can be and are used mounted or secured to many different products, e.g., books, pallets, containers, and electronics.

Currently, products that are housed in containers or cans having metallic portions, e.g., containers or cans for baby foods and other foodstuffs, etc., have not been effectively tagged. As will be appreciated by those skilled in the art, many containers for foods are made of plastic. However, plastic has inherent limitations for housing such products. For example, plastic may allow trace amounts of bacteria through it. Baby food manufacturers are particularly sensitive to the limitations of plastics as a container medium and consequentially, many such manufacturers make their containers or cans out of cardboard tubular midsection having a pressed, thin aluminum foil around the outside of the midsection as a means for preventing liquid leakage out of the container. Additionally, the lid and the base of the can or container are generally made of a thin aluminum sheet. A relatively thick, annular aluminum ring serves to join the lid to the cardboard midsection, a similar ring serves to join the base to the cardboard midsection. This arrangement provides an inexpensive, easily manufactured, waterproof container that can safely hold foodstuffs. However, such containers also include so much metal that they cannot be effectively tagged with an EAS, RFID or other electromagnetic radiation-based tag, since the metal of the container will interfere with the electromagnetic properties of the tag, e.g., the metal portion of the can will reduce the amplitude of the return signal from the tag. Moreover, the metallic portion of the container also tends to act as an antenna, thereby altering the frequency response of the tag.

Furthermore, many EAS tags used in retail establishments are termed "hard tags," which refers to a re-usable tag which is intended to be removed from an article, e.g., merchandise, at the point of sale (POS) to be re-used on other merchandise. Hard tags typically have an injection-molded outer casing. This type of tag is typically found in the apparel industry. U.S. Pat. No. 4,940,968 (DeNood) and U.S. Patent Publication No. 2004/0233042 (Piccoli, Anthony, F., et al.), both of whose entire disclosures are incorporated by reference herein, disclose various exemplary hard tag embodiments.

Thus, a need exists for a re-usable security hard tag which enables the effective tagging of containers, including those with substantial metallic portions, e.g., baby food containers, soup containers, etc.

All references cited herein are incorporated herein by reference in their entireties.

BRIEF SUMMARY OF THE INVENTION

An apparatus for attachment to a container, having first and second container ends (e.g., any lip, bead, or cover associated with either end of the container) and a container wall, onto which a security tag is desired to be secured and wherein the first and second container ends have diameters that are larger than the container wall diameter. The apparatus comprises: two portions having respective first ends pivotally coupled together, and wherein each of the two portions comprises an outwardly extending flange for engaging either one of the first or second container ends; a latching mechanism disposed on one of the two portions that cooperates with the other one of the two portions to latch the two portions together to secure the two portions to either one of the first or second container ends; and a security tag associated with one of the two portions, wherein the tag is capable of receiving a transmitted electromagnetic signal over the air from a transmitter and for returning a desired discernable electromagnetic signal to a receiver.

A method of tagging a container with a security tag whereby the container has first and second ends (e.g., any lip, bead, or cover associated with either end of the container) and a container wall and wherein the first and second container ends have diameters that are larger than the container wall. The method comprises: providing two portions having respective first ends that are pivotally coupled together and wherein each of the two portions comprises an outwardly extending flange; associating a security tag with one of the two portions wherein the tag is capable of receiving a transmitted electromagnetic signal over the air from a transmitter and for returning a desired discernable electromagnetic signal to a receiver; engaging the flanges with either one of the first or second container ends; and securing respective second ends of the two portions together so that the two portions are releasably secured to either one of the first or second container ends.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
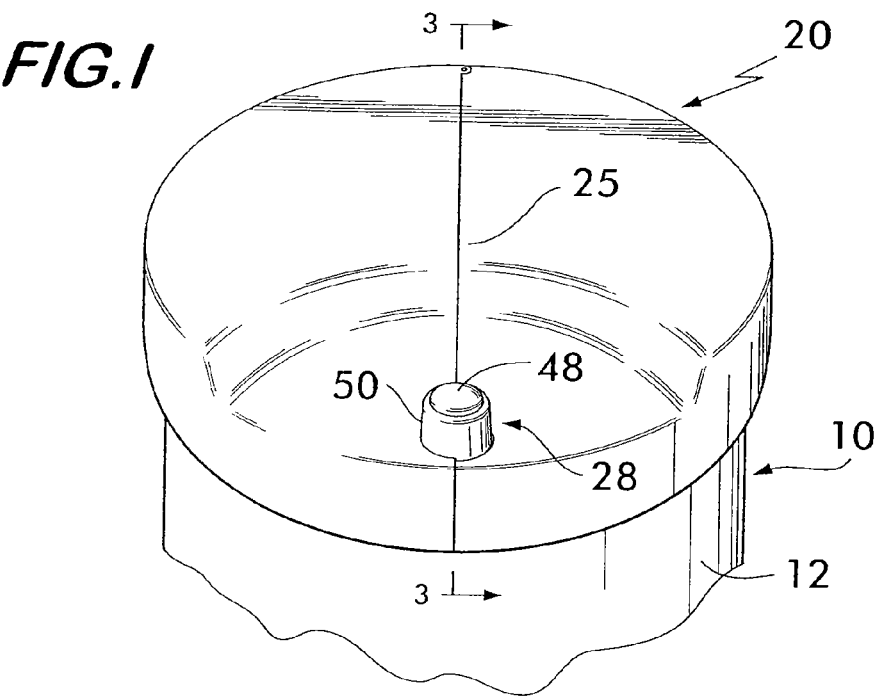
FIG. 1 is an isometric view of the security tag adapter of the present application secured to one end of a container, shown partially.

The security tag adapter 20 for containers of the present invention is shown in FIG. 1. The security tag adapter 20 is arranged for releaseable securement to a lip or bead or cover which is positioned at either end of a container 10. By way of example only, the container 10 may include, but is not limited to, metallic containers such as those used for infant formula, coffee, powdered food products, etc. It should be understood that the terms "lip" or "bead" or "cover" are used in their broadest sense and the important point is that the lip, bead or cover have a diameter that is slightly larger than the container wall 12 diameter, as is most clearly shown in FIG. 2. This "larger diameter" provides an overhang that permits the security tag adapter 20 to engage the lip, bead or cover, as will be discussed in detail later. Thus, the term "container end" 14 as used throughout this Specification includes any lip, bead, or cover associated with either end of the container 10.

Figure 2:
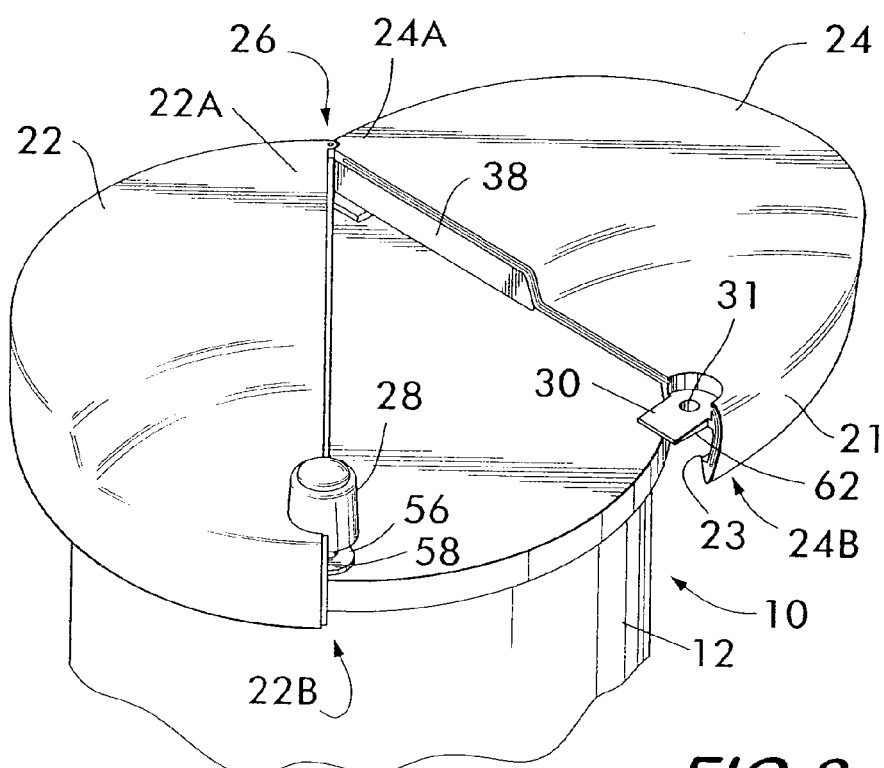
FIG. 2 is also an isometric view of the security tag adapter of FIG. 1 shown in an open, unlocked condition around the end of the container.

As shown in FIG. 2, the security tag adapter 20 comprises two semi-circular portions 22 and 24 that are pivotally coupled (e.g., a hinge 26) at respective first ends 22A and 24A, thereby allowing respective second ends 22B and 24B to move toward or away from each other. A latch mechanism 28 is associated with one of the two portions (e.g., portion 22) and is located at one of the second ends (e.g., 22B). Located at the second end (e.g., 24B) of the other portion 24 is a pin receptacle 30 (having a channel 31) for receiving a displaceable pin 32 (FIGS. 3-5) from the latch mechanism 28 (as will also be discussed in detail later) when the two second ends 22B and 24B are brought together. The semi-circular portions 22/24 may comprise ABS (acrylonitrile butadiene styrene) or may comprise a polycarbonate. The pin receptacle 30 comprises a metal material.

Figure 3:
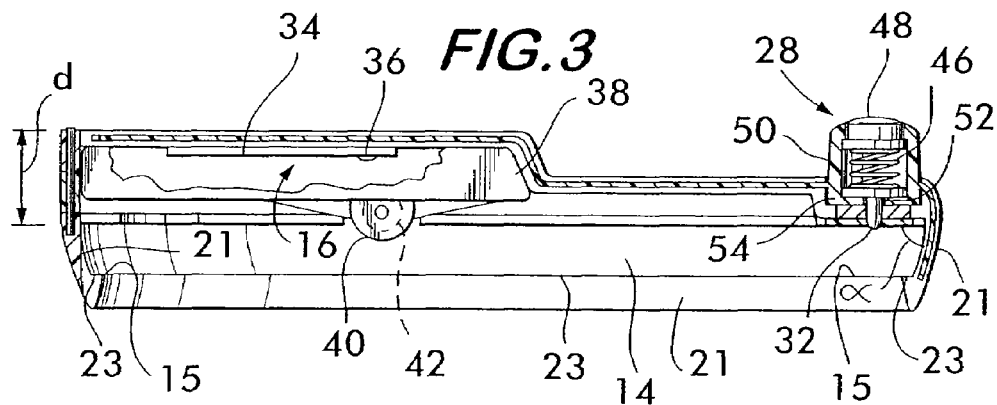
FIG. 3 is a cross sectional view of the security tag adapter taken along line 3-3 of FIG. 1.
Figure 4:
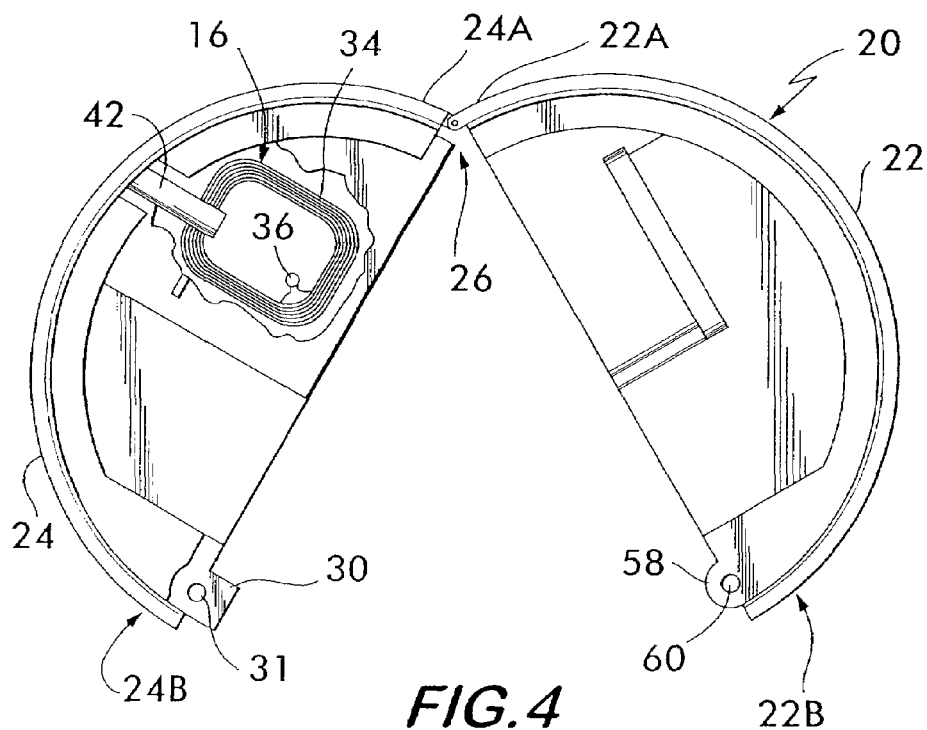
FIG. 4 is a plan view of the bottom of the security tag adapter shown in an open, unlocked condition with a portion of the invention shown broken away, revealing the security tag associated therewith.

FIG. 4 depicts the underside or bottom of the security tag adapter 20 and shows the location of the security tag 16 in break-away. The security tag 16 may comprise an EAS or an RFID type of tag. By way of example only, an EAS tag, comprising an RF coil 34 and capacitor 36 that are tuned to operate in the 8.2 MHz frequency range, is shown. The security tag 16 is concealed under a cover 38 (FIG. 3) in the portion 24, although it is not limited to that portion. Access to the security tag 16 by appropriate personnel, when the adapter 20 is disengaged from the container 10, can be obtained by removing the cover 38. This is accomplished by sliding an integral sleeve 40 (FIG. 3) off of a positioning pin 42; i.e., sliding the sleeve 40 out of the plane of the paper in FIG. 3.

To attach the security tag adapter 20 to the container 10, a projecting, semi-circular, flange 21 (see FIGS. 2, 3 and 5) is provided on the bottom side of each portion 22 and 24; the bottom side of each portion 22 and 24 corresponds to the adapter side that is adjacent the container end 14 when the adapter 20 is attached to the container 10. The flange 21 is integrally molded with the two portions 22 and 24 and the flanges 21 are outwardly extending with respect to the bottom side of each portion 22 and 24; the term "outwardly extending" is meant to cover a flange orientation whereby the flange 21 forms an angle α (FIG. 3) with respect to the bottom side of the two portions 22 and 24 in the range of 20° to 100°. On the inside portion of the flange 21 is a shoulder 23. Because the flange 21 is curved inward (e.g., towards a center 25 of the adapter 20; see FIG. 1), when the flange 21 is brought into contact with the container end 14, the edge 23 makes a close, tight fit underneath the container end 14 (cover or lip, or bead, etc.) 14, i.e., with the bottom edge 15 of the container end 14. As shown most clearly in FIG. 2, the flange 21 and its shoulder 23 of one of the portions (e.g., 22) are brought into contact with the bottom edge 15 of the container end 14. Once this portion 22 is positioned properly, an authorized individual then swings the other portion 24 toward the first portion 22 until the flange 21/shoulder 23 of portion 24 is in tight contact with the bottom edge 15 of the container end 14 also. It should be understood that the either of the portions 22 or 24 could be secured to the container end 14 first followed by the other portion. All that is necessary is to lock the ends 22B and 24B together using the latching mechanism 28.

Figure 5:
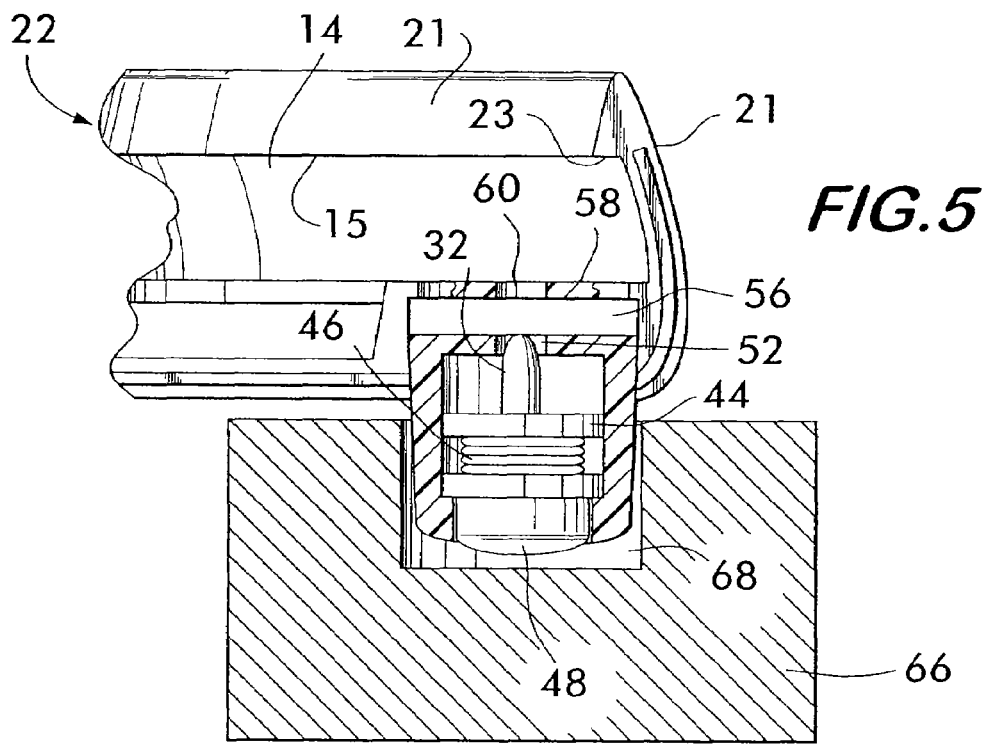
FIG. 5 is a partial cross-sectional view of the latch mechanism of the present invention positioned inside a magnetic detacher which retracts a pin of the latch mechanism, thereby allowing the security tag adapter portions to be disengaged and the adapter opened.

FIGS. 3 and 5 provide a cross-sectional view of the latching mechanism 28. In particular, the latching mechanism 28 comprises the displaceable pin 32 having an integral drive plate 44 which is biased by a spring 46. The upper end of the spring 46 is disposed against a button 48. A housing 50 contains the button 48, the spring 46 and the drive plate 44; only the displaceable pin 32 protrudes out of the housing 50 through a channel 52 (see FIG. 5) in the bottom surface 54 of the housing 50, through a gap 56 and into a second pin receptacle 58 which includes its own channel 60 (see FIG. 4). The housing 50 is formed integrally with the first portion 22, thereby preventing access to the locking mechanism 28 by unauthorized personnel. To lock the two portions 22 and 24 together, the two ends 22B and 24B are move together such that the pin receptacle 30 passes into the gap 56. As can be seen clearly in FIG. 2, the pin receptacle 30 is tapered 62 so that as the pin receptacle slides into the gap 56, it drives the lower end of the displaceable pin 32 upward against the spring 46 bias. As the two portions 22 and 24 continue to move together, the pin 32 passes through the channel 31 in the pin receptacle 30 and through the channel 60 in the pin receptacle 58, thereby locking the two portions 22 and 24 together. With the latch mechanism 28 activated, this renders it nearly impossible for someone to attempt to remove the adapter 20, or the container end 14 of the container 10, by trying to pry either one of them from the container 10.

To unlock the latching mechanism 28, a properly-sized magnet 66 (FIG. 5) is required. This properly-sized magnet 66 forms a portion of a magnetic detacher (not shown) which is only available at the point-of-sale (POS) in the retail environment and is only accessible by approved personnel. In particular, and assuming that the container has been properly purchased, the approved sales personnel, inverts the container 10 with the security tag adapter 20 attached thereto and positions the latch mechanism housing 50 inside a receiving cavity 68 in the magnet 66 of the magnetic detacher (not shown). Because the integral drive plate 44 comprises a ferromagnetic material (e.g., iron), the magnetic field generated by the magnet attracts the drive plate 44 downward, against the bias of the spring 46. This retracts the displaceable pin 32 out of the channel 60 in the pin receptacle 58 as well as out of the channel 31 in the other pin receptacle 30, thereby allowing the store personnel to move the two second ends 22B and 24B away from each other, thereby releasing the security tag adapter 20 from the container 10.

It should be understood that the internal displaceable components (e.g., the drive plate 44) of the latching mechanism 28 comprise as little ferromagnetic material as possible so that no ordinary hand-held magnet can displace these components; rather, only a sufficiently strong magnetic field can displace these components to retract the pin 32.

Figure 6:
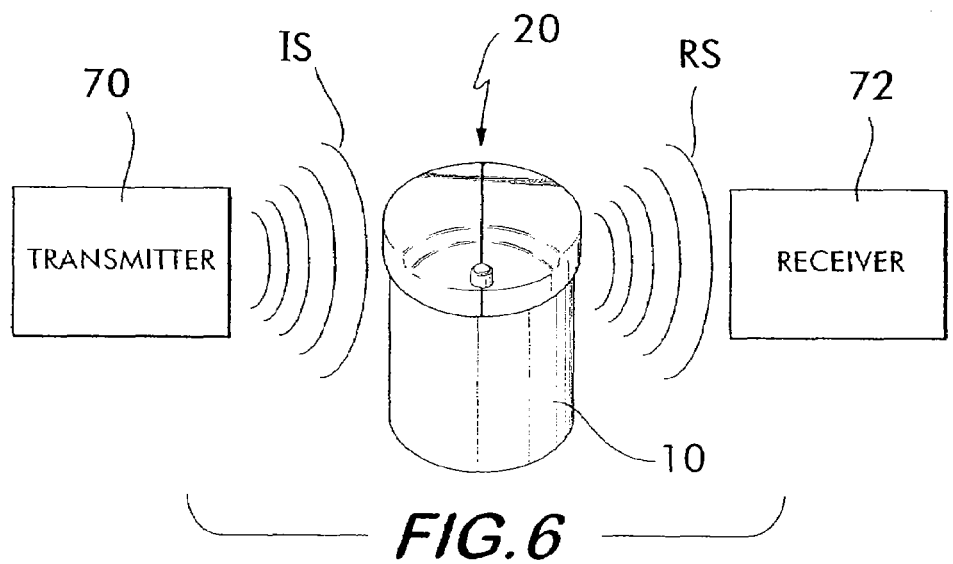
FIG. 6 depicts a functional diagram of a transmitter/receiver system that interacts with the security tag associated with the adapter.

As mentioned earlier, if the container 10 to which the adapter 20 is attached is purchased properly, the store personnel removes the adapter 20 from the container 10 and the patron can exit the store with the container 10. However, as shown in FIG. 6, should an individual attempt to remove the container 10 with the adapter 20 still attached to the container 10, as the combination is moved through a store and passes through exit pedestals (not shown) containing a transmitter 70/receiver 72 combination, the transmitter 70 in that pedestal issues an interrogation signal IS (e.g., an electromagnetic signal in the 8.2 MHz frequency range) to which the security tag 16 in the adapter 20 responds. If the article invention 20 is attempted to pass through the pedestals at the exit, upon receipt of the security tag response signal (e.g., a back-scatter signal that is discernable) RS by the pedestal receiver 72, an alarm or other alert indication (not shown) will immediately be set off to authorized personnel to prevent a theft of the container 10.

Once the security tag adapter 20 is removed from the container 10 after a proper purchase transaction, the adapter 20 can then be re-applied to another container for further use.

To minimize any interference with the security tag 16 operation due to the presence of a metal lid/surface that is associated with the container end 14 to which the adapter 20 is attached, the outwardly extending flanges 21 are designed to maintain the security tag 16 at a predetermined distance d (see FIG. 3) away from the metal lid/surface. In particular, the adapter 20 maintains the security tag 16 approximately 10-12 mm away from the metal lid/surface.

As also mentioned earlier, the EAS security tag 16 is used by way of example only. The security tag used with the adapter 20 may include various kinds of security tags, including RFID security tags. As a result, the transmitter 70/receiver 72 pair shown in FIG. 6 is also by way of example. They can be replaced by an RFID reader which emits an appropriate security tag signal and receives the RFID security tag response. Thus, it should be understood that the security tag associated with the security tag adapter does not limit the scope of the invention.

It should be understood that the pivotal coupling of the first ends 22A/24A is not limited to the hinge 26 as shown but may include other types of hinges, including living hinges.

It should also be understood that the latch mechanism 28 of the present invention is by way of example only and that other types of latch mechanisms can be used. For example, instead of using a spring 46 alone to bias the displaceable pin 32, a variation of a ball clutch mechanism, similar to that shown in U.S. Pat. No. 4,940,968 (DeNood), could be used.

While the invention has been described in detail and with reference to specific examples thereof, it will be apparent to one skilled in the art that various changes and modifications can be made therein without departing from the spirit and scope thereof.

What is claimed is:

1. An apparatus for attachment to a container, having first and second container ends and a container wall, onto which a security tag is desired to be secured, the first and second container ends having diameters that are larger than the container wall diameter, said apparatus comprising:

two portions having respective first ends pivotally coupled together, and wherein each of said two portions comprises an outwardly extending flange for engaging either one of the first or second container ends;

a latching mechanism disposed on one of said two portions that cooperates with the other one of said two portions to latch said two portions together to secure said two portions to either one of the first or second container ends, said latching mechanism being releasable only via a detacher being positioned in close proximity with said latching mechanism; and a security tag associated with one of said two portions, said tag being capable of receiving a transmitted electromagnetic signal over the air from a transmitter and for returning a desired discernable electromagnetic signal to a receiver.

2. The apparatus of claim 1 wherein each of said outwardly extending flanges comprises a shoulder that contacts a bottom edge of said first or second container edge.

3. The apparatus of claim 2 wherein said apparatus comprises a center and wherein each of said outwardly extending flanges is curved inwardly toward said center.

4. The apparatus of claim 1 wherein said two portions are pivotally coupled via a hinge.

5. The apparatus of claim 1 wherein said two portions comprise acrylonitrile butadiene styrene.

6. The apparatus of claim 1 wherein said two portions comprises polycarbonate.

7. The apparatus of claim 1 wherein said security tag comprises a coil and a capacitor.

8. The apparatus of claim 7 wherein said coil and capacitor are tuned to a frequency of approximately 8.2 MHz.

9. The apparatus of claim 8 wherein said transmitted electromagnetic signal is in the frequency range of approximately 8.2 MHz.

10. The apparatus of claim 9 wherein said returned electromagnetic signal is in the frequency range of approximately 8.2 MHz.

11. The apparatus of claim 1 wherein said security tag is concealed within one of said two portions.

12. The apparatus of claim 11 wherein said security tag is concealed within said one of said two portions by being positioned underneath a cover.

13. The apparatus of claim 1 wherein each of said two portions comprise respective second ends comprising respective pin receptacles and wherein said latch mechanism comprises a displaceable pin that passes through said pin receptacles.

14. The apparatus of claim 13 wherein said displaceable pin includes a drive plate and wherein said latch mechanism further comprises spring that acts against said integral drive plate for biasing said displaceable pin through said pin receptacles.

15. The apparatus of claim 14 wherein said drive plate and displaceable pin comprise ferromagnetic material, said drive plate and displaceable pin being attracted to a properly-sized magnet for withdrawing said displaceable pin from said pin receptacles.

16. The apparatus of claim 15 wherein said latch mechanism is contained within a housing integrally formed in one of the two portions.

17. The apparatus of claim 1 wherein said first or second container end comprises a cover and wherein said outwardly extending flange engages a bottom edge of said cover.

18. The apparatus of claim 1 wherein said outwardly extending flange maintains said security tag at a predetermined distance away from a metal lid or surface associated with the container end to which said apparatus is attached.

19. The apparatus of claim 18 wherein said predetermined distance is at least 10 mm.

20. A method of tagging a container with a security tag, the container having first and second ends and a container wall and wherein the first and second container ends have diameters that are larger than the container wall, said method comprising:

providing two portions having respective first ends that are pivotally coupled together and wherein each of said two portions comprises an outwardly extending flange;

associating a security tag with one of the two portions wherein said tag is capable of receiving a transmitted electromagnetic signal over the air from a transmitter and for returning a desired discernable electromagnetic signal to a receiver engaging said flanges with either one of the first or second container ends; and securing respective second ends of said two portions together via a latching mechanism so that said two portions are releasably secured to either one of the first or second container ends, said two portions being releasable only upon the positioning of a detacher in close proximity to said latching mechanism.

21. The method of claim 20 wherein said step of engaging said flanges with either one of the first or second container ends comprises positioning a shoulder of said flanges in close contact with a bottom edge of said first or second container ends.

22. The method of claim 21 wherein said step of engaging said flanges with either one of the first or second ends further comprises orienting said flange to curve inward toward a center of said apparatus.

23. The method of claim 20 wherein said step of associating a security tag with one of said two portions comprises concealing said security tag within one of said two portions.

24. The method of claim 23 wherein said step of concealing said security tag comprises positioning said security tag underneath a cover within one of said two portions.

25. The method of claim 20 wherein said step of securing said respective second ends together comprises passing a displaceable pin through respective pin receptacles in said second ends.

26. The method of claim 25 wherein said step of securing said respective second ends comprises providing a spring that biases said displaceable pin through said respective pin receptacles.

27. The method of claim 26 further comprising the step of releasing said apparatus from the container, said step of releasing said apparatus comprises retracting said displaceable pin against said spring bias using a magnet.

28. The method of claim 27 wherein said step of subjecting said security tag to an interrogation signal comprises bringing said apparatus and the container which it is secured to a location where said interrogation signal is emitted from a transmitter.

29. The method of claim 28 wherein said step of activating an alarm or indication comprises a receiver, positioned at said location, receives a response signal from said security tag in response to said interrogation signal.

30. The method of claim 29 wherein said step of associating a security tag comprises providing a security tag having a coil and a capacitor tuned to a frequency of approximately 8.2 MHz.

31. The method of claim 30 wherein said interrogation signal comprises a frequency of approximately 8.2 MHz.

32. The method of claim 31 wherein said returned electromagnetic signal comprises a frequency of approximately 8.2 MHz.

33. The method of claim 20 further comprising the step of activating an alarm or indication when said security tag is subjected to an interrogation signal.

34. The method of claim 20 wherein said step of associating a security tag with one of the two portions comprises maintaining said security tag at a predetermined distance away from a metal lid or surface associated with the container end to which said two portions are attached.

35. The method of claim 34 wherein said predetermined distance is at least 10 mm.

* * * * *